United States Patent
Kim et al.

(10) Patent No.: US 9,986,237 B2
(45) Date of Patent: May 29, 2018

(54) METHOD FOR MOTION ESTIMATION AND APPARATUS FOR PROCESSING IMAGE

(71) Applicant: Anapass Inc., Seoul (KR)

(72) Inventors: Daehyun Kim, Seoul (KR); Tae Jin Kim, Seoul (KR); Jae Hun Lee, Seoul (KR)

(73) Assignee: ANAPASS INC., Seoul (KR)

( * ) Notice: Subject to any disclaimer, the term of this patent is extended or adjusted under 35 U.S.C. 154(b) by 569 days.

(21) Appl. No.: 14/492,145

(22) Filed: Sep. 22, 2014

(65) Prior Publication Data

US 2015/0110171 A1    Apr. 23, 2015

(30) Foreign Application Priority Data

Oct. 18, 2013  (KR) .......................... 10-2013-0124491

(51) Int. Cl.
| | |
|---|---|
| *H04N 19/14* | (2014.01) |
| *H04N 19/105* | (2014.01) |
| *H04N 19/176* | (2014.01) |
| *H04N 19/182* | (2014.01) |
| *H04N 19/54* | (2014.01) |
| *H04N 19/567* | (2014.01) |

(52) U.S. Cl.
CPC .......... *H04N 19/105* (2014.11); *H04N 19/14* (2014.11); *H04N 19/176* (2014.11); *H04N 19/182* (2014.11); *H04N 19/54* (2014.11); *H04N 19/567* (2014.11)

(58) Field of Classification Search
CPC .......................... H04N 19/567; H04N 19/176
See application file for complete search history.

(56) References Cited

U.S. PATENT DOCUMENTS

| | | | |
|---|---|---|---|
| 2004/0005096 A1* | 1/2004 | Kim | .......................... G06T 9/20 382/243 |
| 2005/0141615 A1* | 6/2005 | Kim | ....................... H04N 5/145 375/240.16 |
| 2009/0110076 A1 | 4/2009 | Chen | |
| 2010/0239239 A1* | 9/2010 | Lee | ......................... H04N 5/145 396/242 |
| 2012/0128223 A1 | 5/2012 | Rivaz et al. | |
| 2012/0314772 A1 | 12/2012 | Chen | |

OTHER PUBLICATIONS

May 3, 2017, Chinese Office Action for related CN application No. 201410548778.6
Xuan Jing, et al., "Smooth Constrained Block Matching Criterion for Motion Estimation", ICASSP 2003, Dec. 31, 2003, pp. 661-664, vol. 3.

* cited by examiner

*Primary Examiner* — Zhubing Ren
(74) *Attorney, Agent, or Firm* — Paratus Law Group, PLLC (57) ABSTRACT

Provided are a method for motion estimation and an apparatus for processing an image. The method includes extracting a pattern from any one frame, classifying the extracted pattern as any one of predetermined basic patterns, counting basic patterns of regions included in macroblocks according to types of the basic patterns to set representative basic patterns of the macroblocks, calculating at least one of a sum of absolute difference (SAD) term coefficient and a smoothness constraint (SC) term coefficient from a correlation between representative basic patterns of macroblocks included in a macroblock group, and calculating a cost function result using at least one of the calculated SAD term coefficient and SC term coefficient.

23 Claims, 7 Drawing Sheets

$$K_H = \begin{bmatrix} -1 & -1 & -1 \\ +2 & +2 & -2 \\ -1 & -1 & -1 \end{bmatrix} \quad K_{+45} = \begin{bmatrix} -1 & -1 & +2 \\ -1 & +2 & -1 \\ +2 & -1 & -1 \end{bmatrix}$$

$$K_V = \begin{bmatrix} -1 & +2 & -1 \\ -1 & +2 & -1 \\ -1 & +2 & -1 \end{bmatrix} \quad K_{-45} = \begin{bmatrix} +2 & -1 & -1 \\ -1 & +2 & -1 \\ -1 & -1 & +2 \end{bmatrix}$$

(a)

$$R_i = K_i * I(x)$$

$$\Downarrow$$

$$P(x) = max(R_i)$$

METHOD FOR MOTION ESTIMATION AND APPARATUS FOR PROCESSING IMAGE

CROSS-REFERENCE TO RELATED APPLICATION

This application claims the benefit under 35 U.S.C. § 119(a) of Korean Patent Application No. 2013-0124491, filed on Oct. 18, 2013 in the Korean Intellectual Property Office, the entire disclosure of which is incorporated herein by reference for all purposes.

BACKGROUND

1. Field

The following description relates to a method for motion estimation and an apparatus for processing an image.

2. Discussion of Related Art

Motion estimation is the process of estimating how an object moves between time-series frames when a display device displays a dynamic image, such as a moving image. Motion estimation is used in various apparatuses for dynamic image processing, such as moving image compression of the Motion Picture Experts Group (MPEG), etc., three-dimensional (3D) noise removal, and frame rate conversion.

There is one existing motion estimation method of dividing a reference image into macroblocks having a uniform size, setting a search region for each macro block in a preceding or following frame, and then calculating the sum of inter-pixel luminance differences between a macroblock of the reference image and the corresponding macroblock of the preceding or following frame according to the macroblocks to find a block having the smallest sum. The sum of inter-pixel luminance differences is calculated using a sum of absolute difference (SAD) given by Equation 1.

$$SAD(x, y) = \sum_{i,j \in W} |I(i, j, t) - I(i+x, j+y, t+1)|, \text{ or} \quad \text{[Equation 1]}$$

$$SAD(x, y) = \sum_{i,j \in W} |I(i, j, t) - I(i+x, j+y, t-1)|$$

Since blocks in a moving object have motion vectors that are similar to each other, it is also possible to use a smoothness constraint (SC) method of calculating differences between a candidate motion vector in a search region of a target image and motion vectors of blocks around a macroblock of a reference image on which motion estimation is performed. An SC value may be calculated as given by Equation 2 below.

$$SC(x, y) = \sum_{i} \|(x, y) - v_i\| \quad \text{[Equation 2]}$$

$$cost(x, y) = SAD(x, y) + \lambda \cdot SC(x, y) \quad \text{[Equation 3]}$$

As given by Equation 3 above, it is possible to perform motion estimation using a cost function that is obtained by multiplying a constant and an SC term to uniformize the weight of an SAD term and the weight of the SC term with respect to a candidate vector (x, y) and summing the SAD term and the SC term multiplied by the constant.

However, when an object includes a region in which regular designs are shown and moves during two successive frames, the regular designs move along with the movement of the object. Upon motion estimation of the object, a pixel difference becomes as small as possible in many blocks due to the regular designs. Therefore, a region in which the object is estimated to move because the cost function is calculated to be the smallest value differs from a region in which the object actually moves. For this reason, errors frequently occur in the motion estimation, and image quality is degraded.

To solve this problem according to related art, motion estimation and pattern recognition are separately performed, and an image is generated by combining two results thereof to perform image processing, such as interpolation. However, when motion estimation and pattern recognition are separately performed as mentioned above, motion information of an object including a region in which regular designs are shown is calculated incorrectly, and pattern recognition and image processing are performed based on the incorrectly calculated motion information of the object. Consequently, the quality of an image displayed through a display device is remarkably degraded.

SUMMARY

In one general aspect, there is provided a method for motion estimation, the method including: extracting a pattern from any one frame; classifying the extracted pattern as any one of predetermined basic patterns; counting basic patterns of regions included in macroblocks according to types of the basic patterns to set representative basic patterns of the macroblocks; calculating at least one of a sum of absolute difference (SAD) term coefficient and a smoothness constraint (SC) term coefficient from a correlation between representative basic patterns of macroblocks included in a macroblock group; and calculating a cost function result using at least one of the calculated SAD term coefficient and SC term coefficient.

In another general aspect, there is provided an apparatus for processing an image, the apparatus including: a pattern extraction unit configured to extract a pattern from any one frame; a pattern classification unit configured to classify the extracted pattern as any one of predetermined basic patterns; an arithmetic unit including a representative basic pattern setter configured to count basic patterns of regions included in macroblocks according to types of the basic patterns to set representative basic patterns of the macroblocks, a correlation calculator configured to calculate a correlation between representative basic patterns of macroblocks included in a macroblock group, a coefficient setter configured to calculate at least one of an SAD term coefficient and an SC term coefficient using the calculated correlation, and a result calculator configured to calculate a cost function result using at least one of the calculated SAD term coefficient and SC term coefficient; and a motion estimation unit configured to perform motion estimation using the calculated cost function result. The apparatus performs image processing using a motion estimation result.

Throughout the drawings and the detailed description, unless otherwise described, the same drawing reference numerals will be understood to refer to the same elements, features, and structures. The relative size and depiction of these elements may be exaggerated for clarity, illustration, and convenience

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary in the art. Also, descriptions of well-known functions and constructions may be omitted for increased clarity and conciseness.

All terms (including technical and scientific ten used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used in this specification should be understood as follows.

The singular forms "a," "an," and "the" are intended to include the plural forms as well, unless the context clearly indicates otherwise. It will be further understood that the terms "comprises," "comprising," "includes" and "including," when used herein, specify the presence of stated features, integers, steps, operations, elements, parts, or combinations thereof, but do not preclude the presence or addition of one or more other features, integers, steps, operations, elements, parts or combinations thereof.

It should also be noted that in some alternative implementations, the operations/functions noted in the blocks may occur out of the order noted in the flowcharts. For example, two blocks shown in succession may in fact be executed substantially concurrently or the blocks may sometimes be executed in the reverse order, depending upon the operations/functionality involved.

Unless otherwise defined, all terms used herein have the same meaning as commonly understood by those of ordinary skill in the ar. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
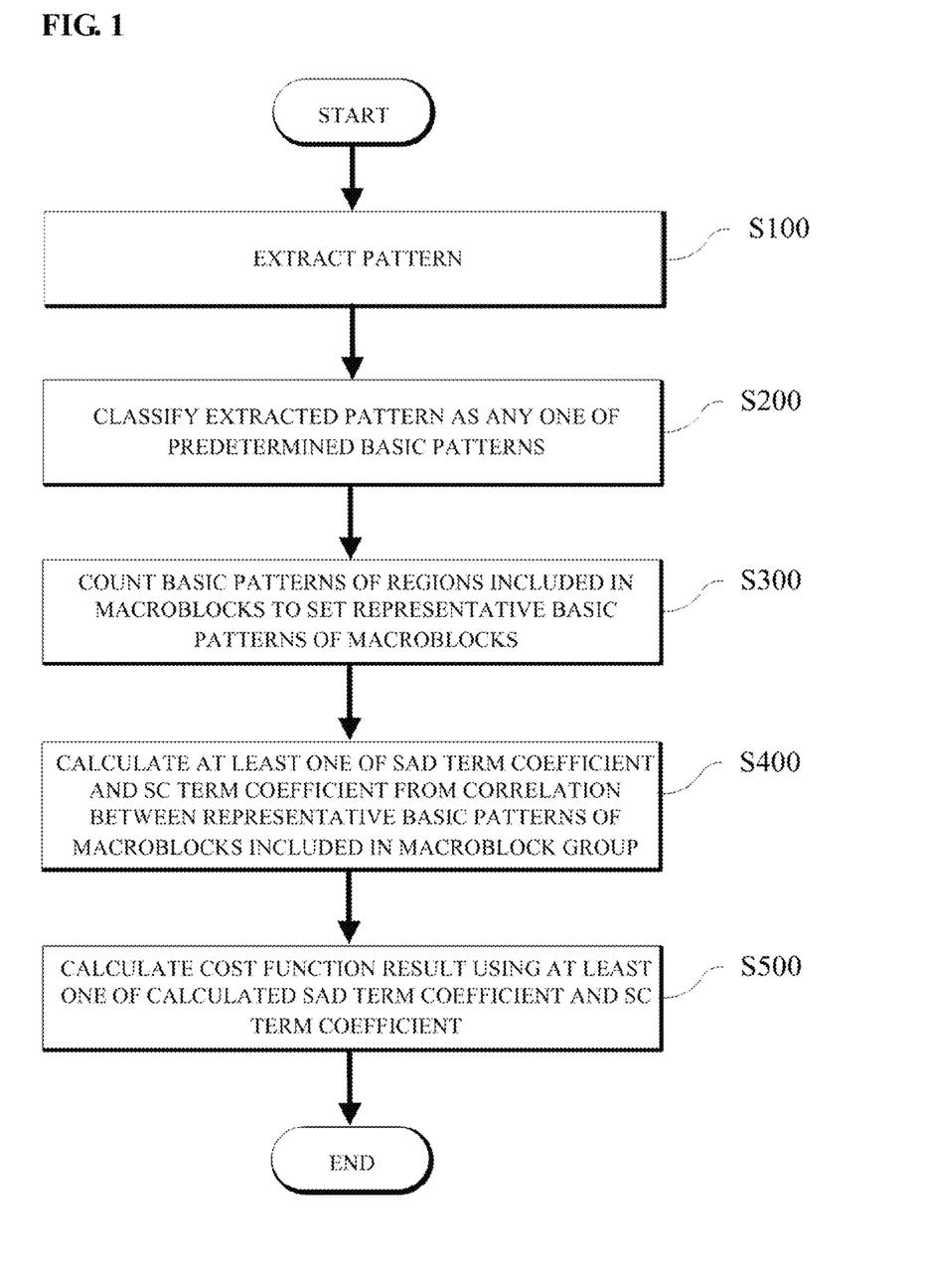
FIG. 1 is a flowchart illustrating an example of a method for motion estimation.
Figure 2:
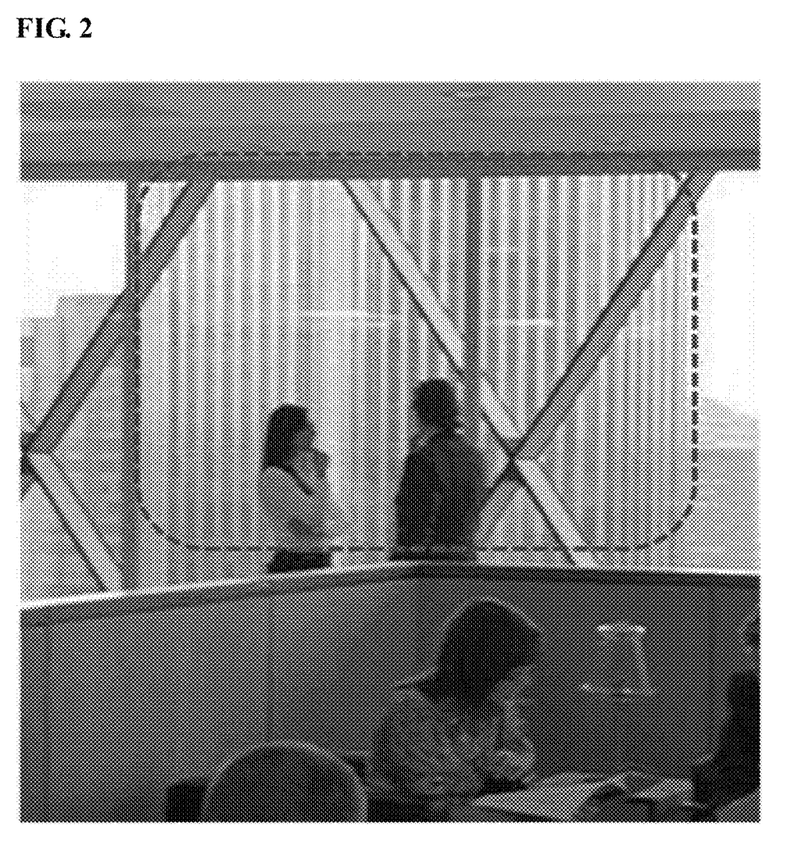
FIG. 2 is illustrating an example of a pattern region in which repeated designs are shown.

Hereinafter, a method for motion estimation according to an exemplary embodiment and an apparatus for processing an image using the method will be described with reference to the accompanying drawings. FIG. 1 is a flowchart illustrating an example of a method for motion estimation, and FIG. 2 is illustrating an example of a pattern region in which repeated designs are shown. A pattern region in which repeated designs which are marked with dotted lines are shown in FIG. 2.

The method for motion estimation according to this exemplary embodiment includes the operation of extracting a pattern from any one frame, the operation of classifying the extracted pattern as any one of predetermined basic patterns, the operation of counting basic patterns of regions included in macroblocks according to types of the basic patterns to set representative basic patterns of the macroblocks, the operation of calculating at least one of a sum of absolute difference (SAD) term coefficient and a smoothness constraint (SC) term coefficient from a correlation between representative basic patterns of macroblocks included in a macroblock group, and the operation of calculating a cost function result using at least one of the calculated SAD term coefficient and SC term coefficient.

Referring to FIGS. 1 and 2, a pattern is extracted from any one frame of a moving image displayed on a display device (S100). In this specification, a pattern denotes a regularly repeated design in an image displayed on a display device. In FIG. 2, an external side of a building has a design in which a surface having a dark color and a surface having a bright color are regularly repeated. An edge is formed at the boundary between the surface having a dark color and the surface having a bright color, and such edges are repeated at uniform intervals. Since an edge is formed not only in the example shown in FIG. 2 but also at the boundary between patterns included in an image displayed on a display device, it is possible to extract a pattern by detecting periodically repeated boundaries. In an exemplary embodiment, the detected pattern may be a pattern that is obtained in units of pixels. In another exemplary embodiment, the detected pattern may be a pattern that is obtained in units of blocks consisting of predetermined pixels.

The extracted pattern is classified as any one of predetermined basic patterns (S200). For example, it is possible to determine whether or not there is a pattern and also define the shapes of a plurality of basic patterns.

Figure 3:
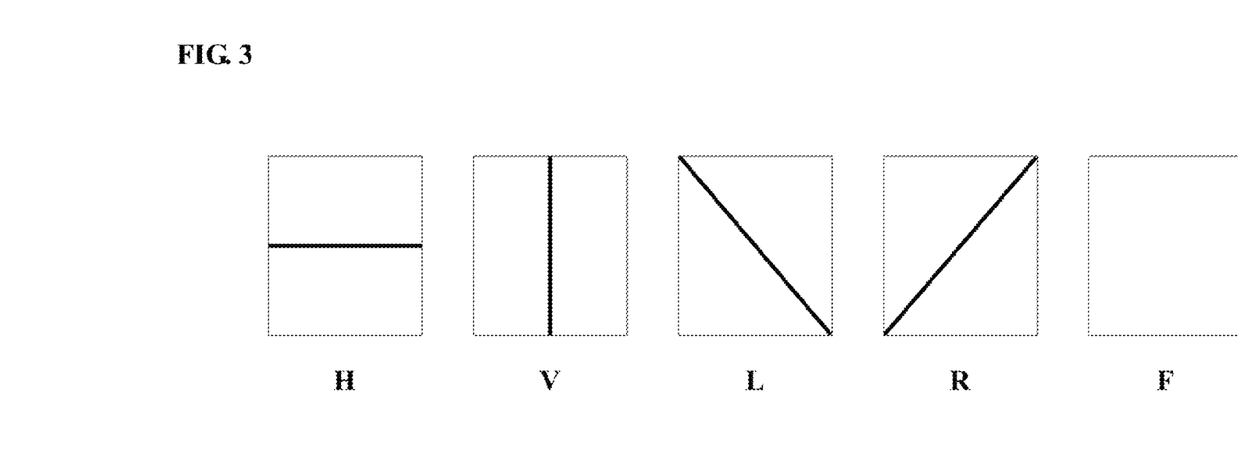
FIG. 3 is a diagram illustrating examples of basic patterns.

FIG. 3 is a diagram illustrating examples of basic patterns. As shown in FIG. 3, an exemplary embodiment of the shapes of basic patterns includes a horizontal edge pattern H, a vertical edge pattern V, a left diagonal edge pattern L, a right diagonal edge pattern R, and a flat pattern F.

Figure 4:
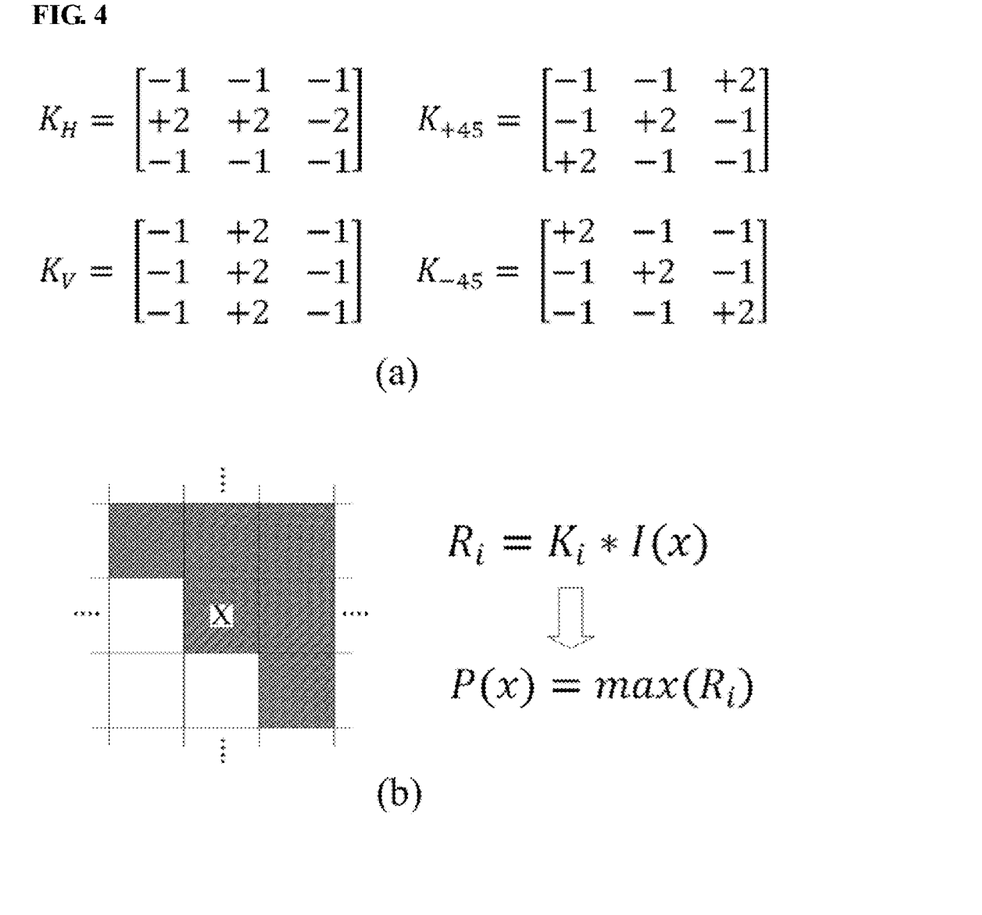
FIG. 4 is a diagram illustrating an example of a mechanism for classifying an extracted pattern as a basic pattern.

For example, pattern classification is performed in units of pixels. FIG. 4 is a diagram illustrating an example of a mechanism for classifying an extracted pattern as a basic pattern.

As exemplified in FIG. 4A, each pixel is classified as one of the basic patterns defined above using four 3×3 line detection operators $K_H$, $K_V$, $K_{+45}$, and $K_{-45}$. As exemplified in FIG. 4B, convolution is performed on any one pixel using each of the 3×3 line detection operators $K_H$, $K_V$, $K_{+45}$, and $K_{-45}$, and then a line detection operator resulting in the largest value is classified as a basic pattern of the center pixel. Alternatively, the direction of a center pixel may be directly calculated using a differential operator, such as a Sobel operator, and classified as a basic pattern.

Figure 5:
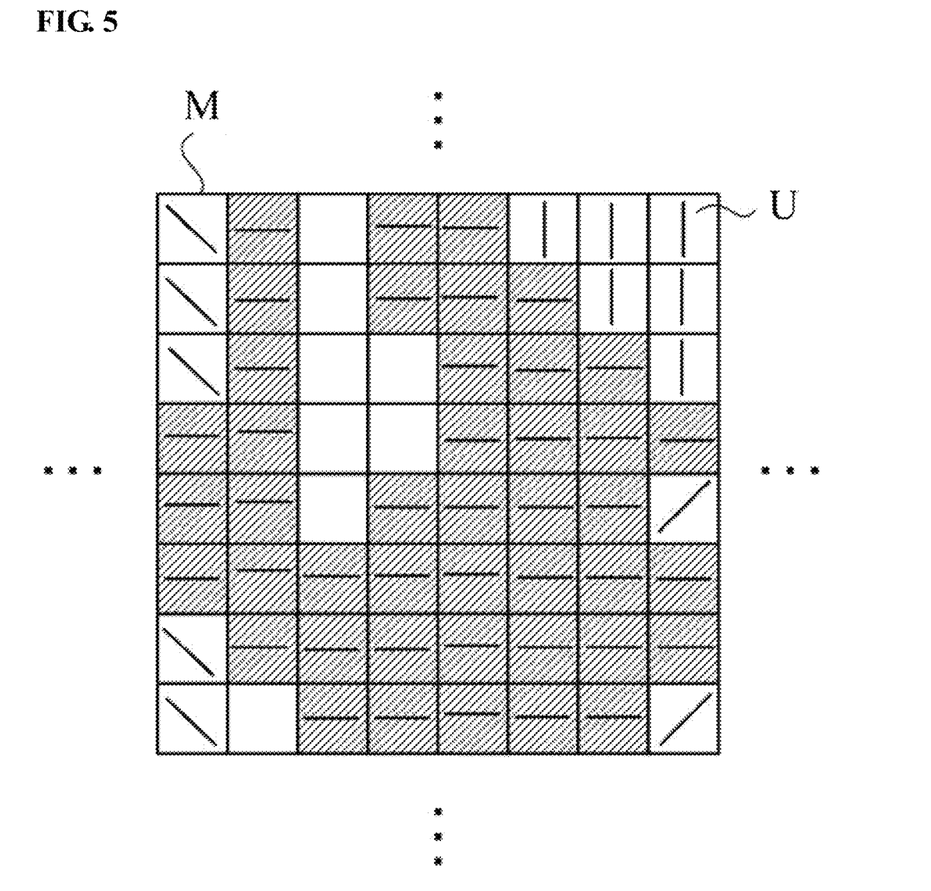
FIG. 5 is a diagram illustrating an example in which a macroblock has been classified into basic patterns.

FIG. 5 is a diagram illustrating an example in which a macroblock has been classified into basic patterns. It should be noted that each unit U constituting a macroblock M shown in FIG. 5 may be one pixel or a block consisting of predetermined pixels, as mentioned above. Referring to FIGS. 1 and 5, basic patterns of regions included in a macroblock are counted according to types of the basic patterns to set the representative basic pattern of the macroblock (S300).

In an exemplary embodiment shown in FIG. 5 in which each unit U of the macroblock M is one pixel, basic patterns included in the macroblock M consisting of 8×8 units are counted according to types of the basic patterns. However, the number of units constituting a macroblock may be changed according to exemplary embodiments. Since the number of horizontal edge patterns H included in the macroblock M is 43, the number of vertical edge patterns V is 6, the number of left diagonal edge patterns L is 5, the number of right diagonal edge patterns R is 2, and the number of flat patterns F is 8, the representative basic pattern of the macroblock M is set to the horizontal edge pattern H, a basic pattern that has the largest number in the macroblock M.

Even when each unit U of the macroblock M is a block consisting of a plurality of pixels, unlike in the above-described exemplary embodiment, basic patterns included in the macroblock M are counted according to types of the basic patterns, and a basic pattern having the largest number is set as the representative basic pattern of the macroblock M.

Figure 6:
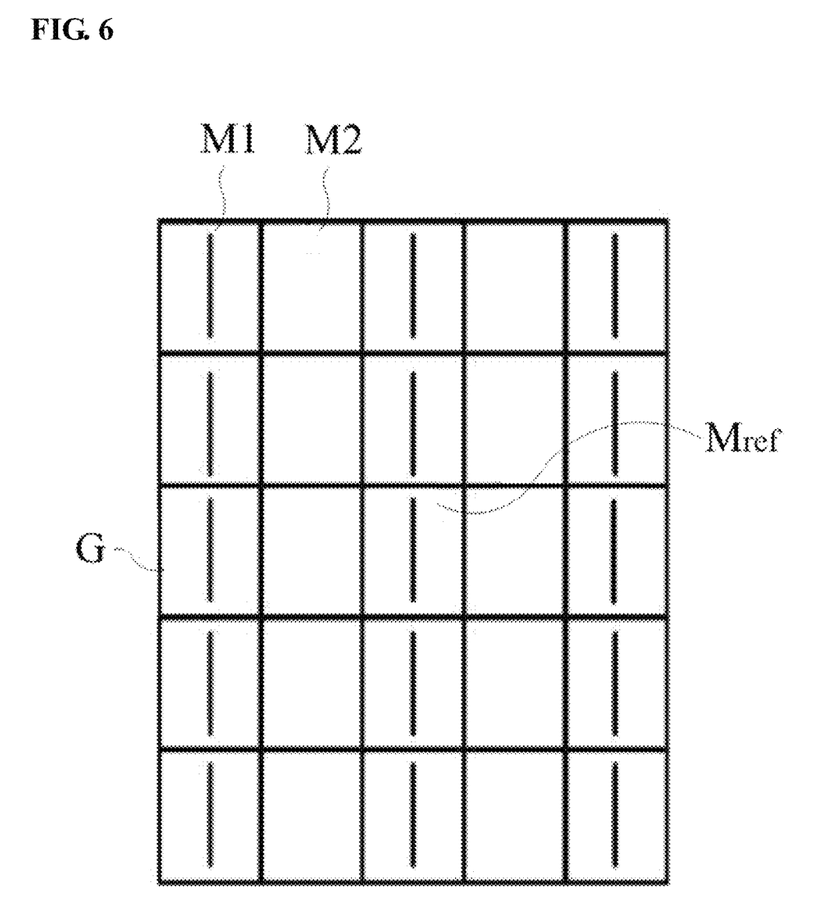
FIG. 6 is a diagram illustrating an example of a macroblock group consisting of a plurality of macroblocks and the representative basic patterns of the macroblocks.

FIG. 6 is a diagram illustrating an example of a macroblock group consisting of a plurality of macroblocks and the representative basic patterns of the macroblocks. FIG. 6 is a diagram illustrating a macroblock group G consisting of a plurality of macroblocks M1, M2, . . . and the representative basic patterns of the macroblocks M1, M2, . . . . Referring to FIGS. 1 and 6, at least one of an SAD term coefficient and an SC term coefficient is calculated from a correlation between the representative basic patterns of the macroblocks M1, M2, . . . included in the macroblock group G (S400). In an exemplary embodiment, any one macroblock included in the macroblock group G is set as a reference macroblock Mref, and a correlation operation is performed between the representative basic pattern of the reference macroblock Mref and the representative basic patterns of the other macroblocks M1, M2, . . . to calculate a correlation.

As an example, a macroblock at the center of the macroblock group G may be set as the reference macroblock Mref, as shown in FIG. 6. As another example, although not shown in the drawing, a macroblock at a predetermined position in the macroblock group G may be set as the reference macroblock Mref.

In an exemplary embodiment of performing a correlation operation to obtain a correlation, predetermined values are set for respective basic patterns, and then a correlation operation given by Equation 4 below is performed on the representative basic pattern of the reference macroblock Mref and the representative basic patterns of the other macroblocks M1, M2, . . . .

$$C = \frac{1}{1 + \sum_{i=1}^{N} |P_o - P_i|} \quad \text{[Equation 4]}$$

(C: correlation, $P_o$: value set for the representative basic pattern of a reference macroblock, $P_i$: values set for the representative basic patterns of macroblocks around the reference macroblock, N: the number of macroblocks included in a macroblock group)

When the representative basic pattern of the reference macroblock Mref and the representative basic patterns of the other macroblocks M1, M2, . . . included in the macroblock group G are identical, the correlation operation of Equation 4 yields a correlation of 1. The more representative basic patterns different from the representative basic pattern of the reference macroblock Mref are included, the smaller a correlation. For example, when 0 is set for the flat pattern F, 1 is set for the horizontal edge pattern H, 2 is set for the left diagonal edge pattern L, 3 is set for the vertical edge pattern V, and 4 is set for the right diagonal edge pattern R, a correlation C of the macroblock group G shown in FIG. 6 is calculated to be approximately 0.032258 because the representative basic pattern of the reference macroblock Mref is the vertical edge pattern V and 3 is set for the vertical edge pattern V.

$$C = \frac{1}{1 + |3-0| \times 10 + |3-3| \times 14} = \frac{1}{31}$$

In another exemplary embodiment of performing a correlation operation to obtain a correlation, the number of representative basic patterns in the macroblock group G that are the same as the representative basic pattern of the reference macroblock Mref may be counted to obtain a correlation. Further, the count number may be divided by the number of macroblocks included in the macroblock group G to obtain a correlation. In this exemplary embodiment also, when the representative basic pattern of the reference macroblock Mref and the representative basic patterns of the other macroblocks M1, M2, . . . included in the macroblock group G are identical, a correlation is calculated to be 1. Also, the more representative basic patterns different from the representative basic pattern of the reference macroblock Mref are included, the smaller a correlation.

When a correlation C of the macroblock group G shown in FIG. 6 is calculated according to this exemplary embodiment, the total number of macroblocks having the same representative basic pattern as the reference macroblock Mref is 15, including the reference macroblock Mref. By calculating a predetermined proportion of the count number, it is possible to obtain a correlation. For example, the correlation C may be calculated by dividing the count number by 25, the number of macroblocks included in the macroblock group G. The correlation C calculated in this way is 15/25=0.6.

It is possible to determine that the macroblock group G having the large correlation C shows a pattern region. When all the representative basic patterns of macroblocks included in the macroblock group G are identical, the macroblock group G shows a part of a pattern, and the calculated correlation is larger than those of any other cases. On the other hand, when different representative basic patterns of macroblocks are included in the macroblock group G in similar numbers, it is not possible to determine that the macroblock group G shows a pattern, and the calculated correlation is smaller than that of a case in which the macroblock group G shows a pattern.

Using the calculated correlation, an SAD term coefficient and an SC term coefficient are calculated (S400). As described above, when an object including a pattern moves during two frames distinguished by time, the value of the SAD term is reduced at a plurality of positions due to a repeatedly and regularly shown design of the object. In other words, even when the motion vectors of respective blocks included in an object are not uniform and thus the SC term is maintained at a predetermined value, the value of the SAD term may be remarkably reduced at a position, and the value of a cost function may be calculated to be the smallest value. In this case, when the object is estimated to move to the position at which the cost function value is calculated to be the smallest value, movement of the object is shown to be different from the actual movement of the object.

To prevent such an error, when motion of an object including a pattern is estimated between two frames distinguished by time, different weights are given to the calculation result of the SC term and the calculation result of the SAD term, thereby preventing a result value of the cost function from being the smallest value at a position at which the object does not actually move.

$$\cos t(x,y) = \alpha \cdot SAD(x,y) + \lambda \cdot SC(x,y) \quad \text{[Equation 5]}$$

As an example, when motion estimation is performed on an object including a pattern, the coefficient of the SC term is adjusted to be large in a cost function shown in Equation 5 so as to make the weight of the calculation result of the SC term larger than the weight of the calculation result of the SAD term in a result value of the cost function. In other words, $\alpha$, the coefficient of the SAD term, is uniformly maintained as a constant regardless of whether or not an object that is a motion-estimation target includes a pattern, and $\lambda$, the coefficient of the SC term, is adjusted to be large when the object that is the motion-estimation target includes a pattern and thus the correlation C is calculated to be high. As another example, by maintaining $\lambda$, the coefficient of the SC term, as a constant and adjusting $\alpha$, the coefficient of the SAD term, it is possible to make the weight of the calculation result of the SC term larger than the weight of the calculation result of the SAD term in a calculation result of the cost function. As still another example, by adjusting $\alpha$, the coefficient of the SAD term, to be small and adjusting $\lambda$, the coefficient of the SC term, to be large, it is possible to make the weight of the calculation result of the SC term larger than the weight of the calculation result of the SAD term in a calculation result of the cost function.

In an exemplary embodiment, by calculating a linear function and/or a non-linear function having the calculated correlation C as an independent variable, at least one of the coefficient of the SAD term and the coefficient of the SC term is found. In another exemplary embodiment, the coefficient of the SAD term and/or the coefficient of the SC term may be experimentally determined according to the correlation C, and results of the determination may be stored in a lookup table, so that at least one of the coefficient of the SAD term and the coefficient of the SC term may be adjusted according to correlations that are calculated according to frames.

In an exemplary embodiment, a cost function employing at least one of the coefficient of the SAD term and the coefficient of the SC term calculated according to the correlation is calculated to estimate motion of the object (S500). The motion estimation may be performed using at least one of full search, three-step search, and recursive search.

Figure 7:
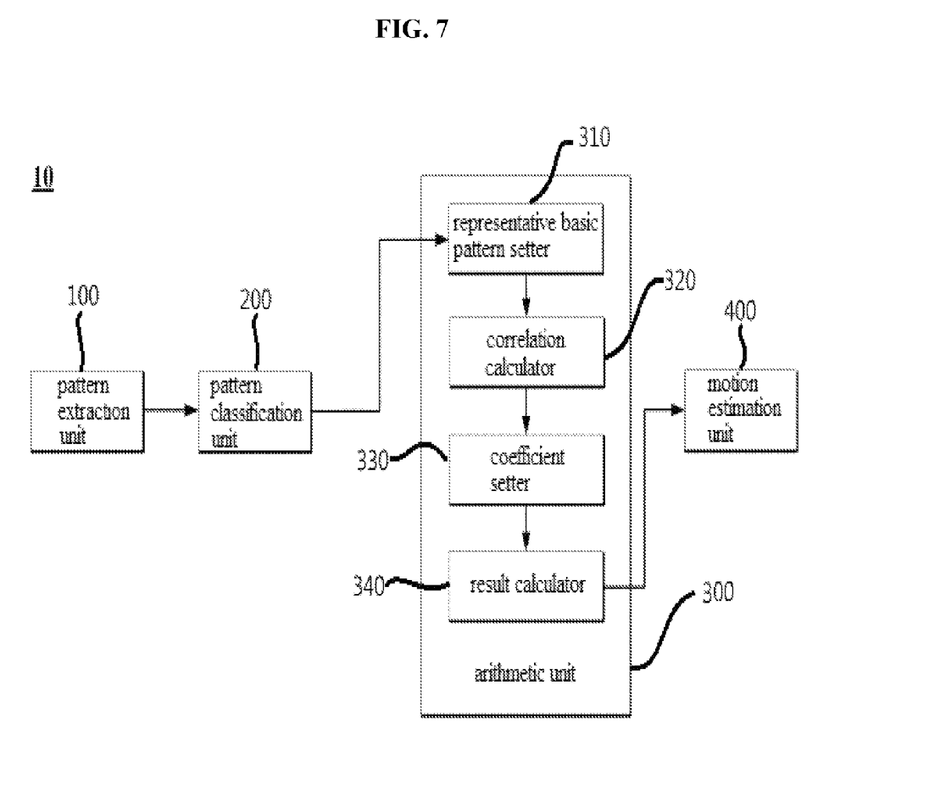
FIG. 7 is a block diagram illustrating an example of an apparatus for processing an image.

With reference to FIG. 7, an apparatus for processing an image according to an example will be described below. FIG. 7 is a block diagram illustrating an example of an apparatus for processing an image.

For brief and clear description, the same details as described in the above exemplary embodiments may be omitted. An apparatus 10 for processing an image according to this exemplary embodiment includes: a pattern extraction unit 100 that extracts a pattern from any one frame; a pattern classification unit 200 that classifies the extracted pattern as any one of predetermined basic patterns; an arithmetic unit 300 including a representative basic pattern setter 310 that counts basic patterns of regions included in macroblocks according to types of the basic patterns to set representative basic patterns of the macroblocks, a coefficient setter 330 that calculates at least one of an SAD term coefficient and an SC term coefficient using a correlation between the representative basic patterns of macroblocks included in a macroblock group, and a result calculator 340 that calculates a cost function result using at least one of the calculated SAD term coefficient and SC term coefficient; and a motion estimation unit 400 that performs motion estimation using the calculated cost function result.

Referring to FIG. 7, the pattern extraction unit 100 extracts a pattern from a moving-image frame. As defined above, a pattern denotes a regularly repeated design in an image displayed on a display device. The pattern extraction unit 100 detects edges forming the boundary between surfaces constituting a pattern and extracts the pattern. In an exemplary embodiment, the pattern extraction unit 100 extracts a pattern in units of pixels. In another exemplary embodiment, the pattern extraction unit 100 extracts a pattern in units of blocks consisting of predetermined pixels.

The pattern classification unit 200 classifies the extracted pattern as any one of predetermined basic patterns. In an exemplary embodiment, as shown in FIG. 3, basic patterns include a horizontal edge pattern H, a vertical edge pattern V, a left diagonal edge pattern L, a right diagonal edge pattern R, and a flat pattern F. The pattern classification unit 200 sets a block of a predetermined size with any one pixel centered therein, and determines a basic pattern that is most similar to a pattern formed by the block, thereby determining a basic pattern to which the pixel belongs. Alternatively, the pattern classification unit 200 sets a block of a predetermined size with any one pixel centered therein, and determines a basic pattern that is most similar to a pattern formed by the block, thereby determining a basic pattern to which the block belongs.

The representative basic pattern setter 310 included in the arithmetic unit 300 counts basic patterns of regions included in macroblocks according to types of the basic patterns to set representative basic patterns of the macroblocks.

A correlation calculator 320 calculates a correlation between the representative basic patterns of macroblocks included in a macroblock group. In an example of calculating a correlation C, a macroblock at the center of the macroblock group G may be set as the reference macroblock Mref, as shown in FIG. 6. In another example, although not shown in the drawing, a macroblock at a predetermined position of the macroblock group G may be set as the reference macroblock Mref. Predetermined values are set for respective basic patterns of the macroblocks included in the macroblock group, and a correlation operation given by Equation 4 is performed on the representative basic pattern of the reference macroblock Mref and the representative basic patterns of the other macroblocks included in the macroblock group G to obtain the correlation C.

In another example of calculating the correlation C, the number of representative basic patterns in the macroblock group G that are the same as the representative basic pattern of the reference macroblock Mref may be counted to obtain the correlation C. Further, the count number may be divided by the number of macroblocks included in the macroblock group G to obtain the correlation C. The more the representative basic patterns of the macroblocks included in the macroblock group G are uniform, the larger the calculated correlation C.

The coefficient setter 330 calculates at least one of an SAD term coefficient and an SC term coefficient using the calculated correlation C. In order to reduce a motion estimation error of an object having a pattern as much as possible, it is necessary to make the weight of a calculation result of the SC term larger than the weight of a calculation result of the SAD term in a calculation result of the cost function. To this end, the coefficient setter 330 sets a coefficient of the SC term to be large. In other words, α, the coefficient of the SAD term, is uniformly maintained as a constant regardless of whether or not an object that is a motion-estimation target includes a pattern, and λ, the coefficient of the SC term, is set to be large when the object that is the motion-estimation target includes a pattern and thus the correlation C is calculated to be high. As another example, by maintaining λ, the coefficient of the SC term, as a constant and adjusting α, the coefficient of the SAD term, the coefficient setter 330 may set the weight of the calculation result of the SC term to be larger than the weight of the calculation result of the SAD term in a calculation result of the cost function. As still another example, by adjusting α, the coefficient of the SAD term, to be small and adjusting λ, the coefficient of the SC term, to be large, the coefficient setter 330 may set the weight of the calculation result of the SC term to be larger than the weight of the calculation result of the SAD term in a calculation result of the cost function.

The coefficient setter 330 calculates a linear function and/or a non-linear function having the calculated correlation C as an independent variable, and sets at least one of the coefficient of the SAD term and the coefficient of the SC term based on the calculation result. In another exemplary embodiment, at least one of the coefficient of the SAD term and the coefficient of the SC term is stored in a memory in the form of a lookup table. The coefficient setter 330 may search the lookup table stored in the memory using the calculated correlation C to set the coefficient of the SAD term and the coefficient of the SC term.

The result calculator 340 included in the arithmetic unit 300 calculates a result value of the cost function using the coefficient of each term set by the coefficient setter 330. The motion estimation unit 400 performs motion estimation using at least one of full search, three-step search, and recursive search with the result value of the cost function. However, it is also possible to use a motion estimation technique that has not been mentioned above.

According to this exemplary embodiment, when motion estimation is performed on an object including a pattern between two frames distinguished by time, a motion estimation error caused by the pattern can be reduced as much as possible, and it is possible to improve accuracy in motion estimation of the object including the pattern accordingly. According to this exemplary embodiment, it is also possible to reduce, as much as possible, the degradation of image quality caused by an error occurring in motion estimation of an object including a pattern.

Furthermore, according to this exemplary embodiment, pattern recognition and motion estimation are not separately performed, and thus it is possible to prevent the degradation of image quality resulting from the inaccuracy of motion estimation caused by separately performing pattern recognition and motion estimation according to related art.

According to example, when motion estimation is performed on an object including regular designs, it is possible to give dynamically varying weights to the calculation result of an SAD term and the calculation result of an SC term. Therefore, an error can be reduced through motion estimation based on a cost function.

In addition, according to example, motion is estimated using a cost function that dynamically changes according to the shape of a moving object. Therefore, it is possible to prevent or reduce degradation of the quality of a displayed image as much as possible.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for motion estimation, comprising:
extracting a pattern having a regularly repeated design from any one frame;
classifying the extracted pattern as any one of predetermined basic patterns;
counting basic patterns of regions included in macroblocks according to types of the basic patterns and setting representative basic patterns of the macroblocks based on the counted basic patterns of regions included in the macroblocks;
calculating at least one of a sum of absolute difference (SAD) term coefficient and a smoothness constraint (SC) term coefficient from a correlation between the representative basic patterns of macroblocks included in a macroblock group; and
calculating a cost function result using at least one of the calculated SAD term coefficient and SC term coefficient,
wherein the correlation between the representative basic patterns of the macroblocks included in the macroblock group is obtained by performing a correlation operation between a representative basic pattern of a reference macroblock included in the macroblock group and the representative basic patterns of macroblocks around the reference macroblock, and
wherein the correlation operation is performed by calculating an equation $$C = \frac{1}{1 + \sum_{i=1}^{N} |P_0 - P_i|}$$

(C: correlation, Po: value set for the representative basic pattern of the reference macroblock, Pi: values set for the representative basic patterns of the macroblocks around the reference macroblock, N: number of the macroblocks included in the macroblock group).

2. The method of claim 1, wherein the extracting of the pattern includes detecting edges between objects shown in the frame.

3. The method of claim 1, wherein the extracting of the pattern includes extracting the pattern in units of pixels.

4. The method of claim 1, wherein the extracting of the pattern includes extracting the pattern in units of blocks consisting of predetermined pixels.

5. The method of claim 1, wherein the predetermined basic patterns include a flat pattern, a horizontal edge pattern, a vertical edge pattern, a left diagonal edge pattern, and a right diagonal edge pattern.

6. The method of claim 1, wherein the classifying of the extracted pattern as the one of the predetermined basic patterns includes comparing the extracted pattern with the predetermined basic patterns and selecting a predetermined basic pattern most similar to the extracted pattern.

7. The method of claim 1, wherein the classifying of the extracted pattern as the one of the predetermined basic patterns includes classifying each pixel as one of the predetermined basic patterns using any one of a line detection operator and a Sobel operator.

8. The method of claim 1, wherein the setting of the representative basic patterns of the macroblocks includes determining one type of basic pattern having a largest number among basic patterns of a region included in each macroblock as a representative basic pattern of the macroblock.

9. The method of claim 1, wherein the correlation between the representative basic patterns of the macroblocks included in the macroblock group is obtained by counting the representative basic patterns of the macroblocks included in the macroblock group according to types of the representative basic patterns, and calculating a ratio of a largest number of representative basic patterns of one type to a number of the macroblocks included in the macroblock group.

10. The method of claim 1, wherein the calculating of the at least one of the SAD term coefficient and the SC term coefficient from the correlation includes setting the SAD term coefficient as a constant, and calculating the SC term coefficient to change according to the correlation.

11. The method of claim 1, wherein the calculating of the at least one of the SAD term coefficient and the SC term coefficient from the correlation includes calculating the at least one of the SAD term coefficient and the SC term coefficient during motion estimation of an object including the pattern so that weight of an SC term is larger than weight of an SAD term.

12. The method of claim 1, wherein the calculating of the at least one of the SAD term coefficient and the SC term coefficient from the correlation includes calculating the at least one of the SAD term coefficient and the SC term coefficient by calculating at least one of a linear function and a non-linear function having the correlation as an independent variable or by using a lookup table according to the correlation.

13. An apparatus for processing an image, the apparatus comprising:
    circuitry configured to:
    extract a pattern having a regularly repeated design from any one frame;
    classify the extracted pattern as any one of predetermined basic patterns;
    count basic patterns of regions included in macroblocks according to types of the basic patterns;
    set representative basic patterns of the macroblocks based on the counted basic patterns of regions includes in the macroblocks;
    calculate a correlation between the representative basic patterns of macroblocks included in a macroblock group;
    calculate at least one of a sum of absolute difference (SAD) term coefficient and a smoothness constraint (SC) term coefficient using the calculated correlation;
    calculate a cost function result using at least one of the calculated SAD term coefficient and SC term coefficient; and
    perform motion estimation using the calculated cost function result,
    wherein image processing is performed using the motion estimation,
    wherein the correlation between the representative basic patterns of the macroblocks included in the macroblock group is calculated by performing a correlation operation between a representative basic pattern of a reference macroblock included in the macroblock group and the representative basic patterns of macroblocks around the reference macroblock, and
    wherein the circuitry calculates the correlation between the representative basic pattern of the reference macroblock included in the macroblock group and the representative basic patterns of the macroblocks around the reference macroblock by calculating an equation $$C = \frac{1}{1 + \sum_{i=1}^{N} |P_0 - P_i|}$$

(C: correlation, Po: value set for the representative basic pattern of the reference macroblock, Pi: values set for the representative basic patterns of the macroblocks around the reference macroblock, N: number of the macroblocks included in the macroblock group).

14. The apparatus of claim 13, wherein the circuitry detects edges between objects shown in the frame to detect the pattern.

15. The apparatus of claim 13, wherein the circuitry extracts the pattern in units of pixels or blocks.

16. The apparatus of claim 13, wherein the circuitry compares the extracted pattern with the predetermined basic patterns including a flat pattern, a horizontal edge pattern, a vertical edge pattern, a left diagonal edge pattern, and a right diagonal edge pattern.

17. The apparatus of claim 13, wherein the circuitry classifies the extracted pattern by comparing the extracted pattern with the predetermined basic patterns and selecting a predetermined basic pattern most similar to the extracted pattern.

18. The apparatus of claim 13, wherein the circuitry classifies each pixel as one of the predetermined basic patterns using any one of a line detection operator and a Sobel operator.

19. The apparatus of claim 13, wherein the circuitry calculates the correlation between the representative basic patterns of the macroblocks included in the macroblock group by counting the basic patterns of the macroblocks included in the macroblock group according to types of the basic patterns and calculating a ratio of a largest number of representative basic patterns of one type to a number of the macroblocks included in the macroblock group.

20. The apparatus of claim 13, wherein the circuitry sets the SAD term coefficient as a constant, and calculates the SC term coefficient to change according to the correlation.

21. The apparatus of claim 13, wherein the circuitry calculates the at least one of the SAD term coefficient and the SC term coefficient during motion estimation of an object including the pattern so that weight of an SC term is larger than weight of an SAD term.

22. The apparatus of claim 13, wherein the circuitry calculates the at least one of the SAD term coefficient and the SC term coefficient by calculating at least one of a linear function and a non-linear function having the correlation as an independent variable or by using a lookup table according to the correlation.

23. The apparatus of claim 13, wherein the motion estimation is performed using any one of full search, three-step search, and recursive search.

* * * * *